Figure 1:
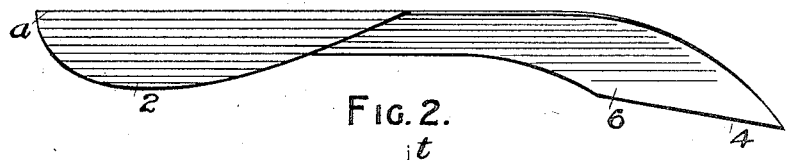

J. G. A. KITCHEN.
FLYING MACHINE.
APPLICATION FILED FEB. 26, 1913.

1,076,377.

Patented Oct. 21, 1913.

3 SHEETS—SHEET 1.

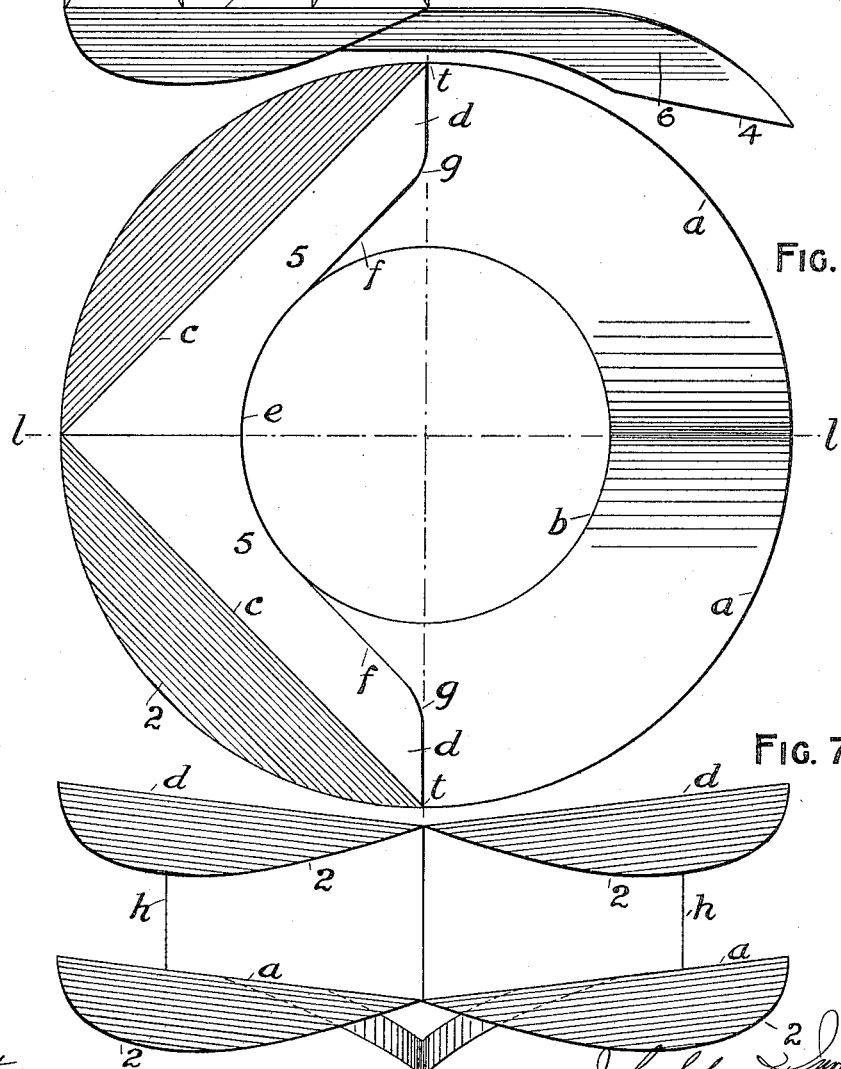

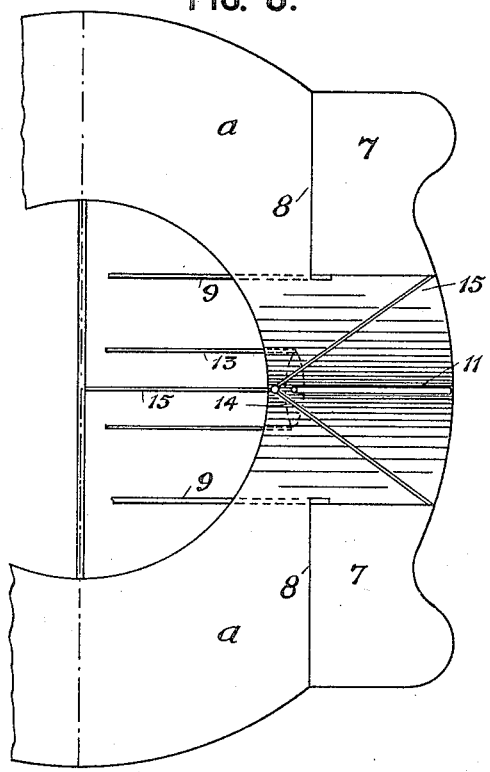
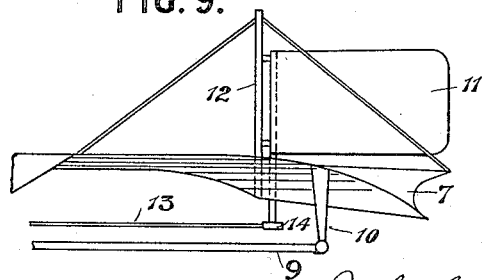

UNITED STATES PATENT OFFICE.

JOHN GEORGE AULSEBROOK KITCHEN, OF SCOTFORTH, ENGLAND.

FLYING-MACHINE.

1,076,377.  Specification of Letters Patent.  Patented Oct. 21, 1913.

Application filed February 26, 1913. Serial No. 750,885.

*To all whom it may concern:*

Be it known that I, JOHN GEORGE AULSEBROOK KITCHEN, a subject of the King of Great Britain and Ireland, residing at 7 Rose Bank, Scotforth, Lancaster, England, have invented new and useful Improvements in Flying-Machines, of which the following is a specification.

This invention refers to flying machines in which the main supporting area or plane surfaces, has a circular or approximately circular configuration in plan with an inclosed opening therein laterally central.

The improvements relate chiefly to the superficial form of the supporting areas, and have for their object to increase the lifting or carrying power and to improve the stability of machines with main supporting areas of circular configuration.

According to this invention, the rear part of the main supporting area or surface, that is to say behind the transverse center line, is depressed along the longitudinal center line of the machine, so as to provide a depression in the upper surface and a keel like formation or ridge on the underside from the edge of which the surface sweeps upward with a concave curve on each side thereof. The two halves of each supporting area are preferably set at a relative dihedral angle of suitable inclination along the longitudinal center line. The leading edge margin of each half or wing of the main supporting surface is preferably deflected and the deflection may be along a chord between the longitudinal and transverse center lines. This form of main supporting area may in some cases be supplemented by a superimposed supporting area above the forward portion of said main supporting area. This supplemental supporting area may have a similar configuration to that of the main supporting area forward of the transverse center line and may have a similarly deflected leading edge margin. The rear edge of the center part of this supplemental area, may extend to and follow the outline of the inclosed opening of the main supporting area, for a short distance and may then extend with its edge approximately parallel with the chord of the deflected margin, rearward.

The wings or halves may be in one plane or they may meet with a dihedral angle as above stated, the tips being either upwardly or downwardly directed as desired and may be vertically above the corresponding part of the lower supporting surface or staggered over relatively thereto.

In the drawings attached hereto, the improvements are shown applied to both a monoplane and a biplane. The motor, propeller or screw and controlling gear are not shown nor the construction of the framework or the chassis.

Figure 2:
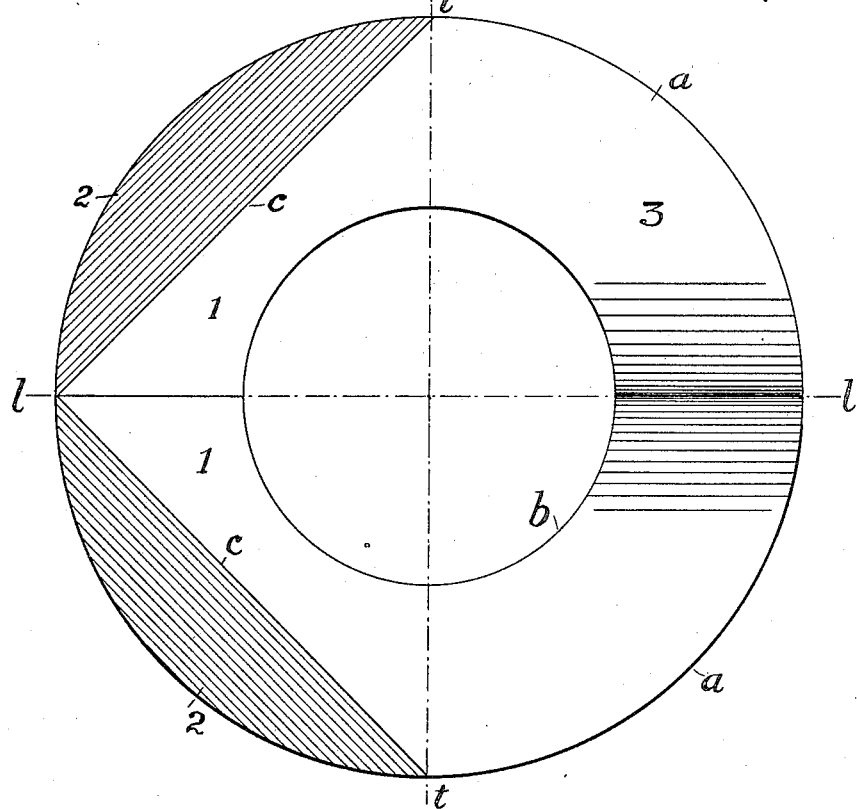
Figure 3:
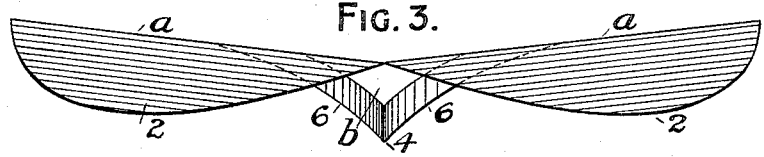

Figure 1 represents a side elevation of the supporting area of the monoplane; Fig. 2 a plan of the same looking from above; Fig. 3 a front view and Fig. 4 a rear view. Fig. 5 represents a side elevation of the supporting area of the biplane; Fig. 6 a plan looking from above, and Fig. 7 a front view. Fig. 8 represents in plan, an arrangement of elevators and rudders which may be used, and Fig. 9 a side elevation thereof.

In the drawings the main supporting area is circular in plan with a central circular opening therein. It has the area in two planes forming wings meeting at the longitudinal center line with a dihedral angle the tips being upwardly directed.

Figs. 1 to 4 will be first referred to. The longitudinal center line is represented by $l$, and the transverse center line by $t$. The laterally extending halves or wings of the main supporting surface are indicated by $a$, $a$, and the central inclosed opening by $b$. The portion 1 of the forward part of each wing $a$ is approximately flat and the shaded part 2 is cambered or deflected downward along the chord $c$.

Figure 4:
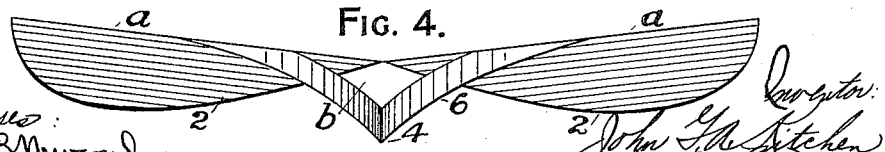

The portion to the rear of the transverse center line $t$, indicated by 3 is depressed along the line $l$, so as to obtain a ridge such as 4 from which the surface curves upward to the main surface as will be seen at 6, Figs. 1, 3, and 4.

Referring now to Figs. 5 to 7, the main supporting area $a$, $a$, is formed as previously described with reference to Figs. 1 to 4, but there is a supplementary supporting surface comprising the wings $d$, $d$, which extend rearwardly to the transverse center line $t$ only. The front or leading edge margin of each wing is deflected at 2 in a similar manner to that of the main supporting area $a$, $a$, having a flat portion 5 on each wing. The rear edge of the supplementary supporting area $d$, $d$, follows the curvature of the opening $b$ at $e$ for a short distance and then extends tangentially on each side of the longitudinal center line $l$ to the transverse center line *t* as indicated at *f*, the inside corner *g* being rounded as shown. These wings *d*, *d*, are carried on a vertical structure indicated by *h* Figs. 5 and 7, built on the main frame or chassis of the machine which is not shown in the drawings. The structure may be made in any suitable known way.

Any suitable arrangement of elevating and directing planes may be used with my improved machine. In Figs. 8 and 9 is shown an arrangement which can be conveniently applied. The elevators consists of the ailerons 7 which are hinged at the rear end of the main supporting wings *a*, *a*, along the lines 8, and may be actuated from the pilot's seat through rods 9 and levers 10. In Fig. 9, the ailerons 7 are shown slightly elevated. The rudder 11 is hinged to a mast 12 and may be actuated through tension wires 13 and a tiller 14. Stays for this are represented by 15.

What I claim as my invention and desire to secure by Letters Patent of the United States is:—

1. In flying machines, an approximately circular main supporting area with an inclosed opening laterally central therein, the rear part of said supporting area having a sharp deep depression in the upper surface along the longitudinal center line forming a keel on the underside.

2. In flying machines, an approximately circular supporting area with an opening laterally central therein, the underside of the rear part of said supporting area projecting into a keel along the longitudinal center line, the sides thereof being inwardly curved.

3. In flying machines, an approximately circular main supporting area with an inclosed opening laterally central therein, the rear part of said supporting area having a sharp deep depression with curved sides in the upper surface along the longitudinal center line forming a keel with concave sides on the underside.

4. In flying machines, an approximately circular main supporting area with an inclosed opening laterally central therein and a deflected leading edge margin, the rear part of said supporting area having a sharp deep depression in the upper surface along the longitudinal center line forming a keel on the underside.

5. In flying machines, an approximately circular main supporting area with an inclosed opening laterally central therein and a sharp deep depression in the upper surface along the longitudinal center line in the rear part of said surface, forming a keel on the underside and a superimposed auxiliary supporting surface in front of the transverse center line, and of approximately the same superficial area and form as the front half of the main supporting area.

6. In flying machines, an approximately circular main supporting area with an inclosed opening laterally central therein and a sharp deep depression in the upper surface along the longitudinal center line in the rear part of said surface and forming a keel on the underside and a deflected leading edge margin, and a superimposed auxiliary supporting surface over the front part of the main supporting area, said auxiliary supporting area having approximately the same form and depth of surface as the main supporting area covered by it, the ends of the said surface being rounded.

In testimony whereof I have hereunto signed my name in the presence of two subscribing witnesses.

JOHN GEORGE AULSEBROOK KITCHEN.

Witnesses:
JAMES CRUICKSHANK,
CHAS. BERRY.

---

Copies of this patent may be obtained for five cents each, by addressing the "Commissioner of Patents, Washington, D. C."